May 6, 1930.  E. R. SLAGLE  1,757,486
GENERATOR AND BATTERY PROTECTIVE MEANS
Filed June 27, 1925
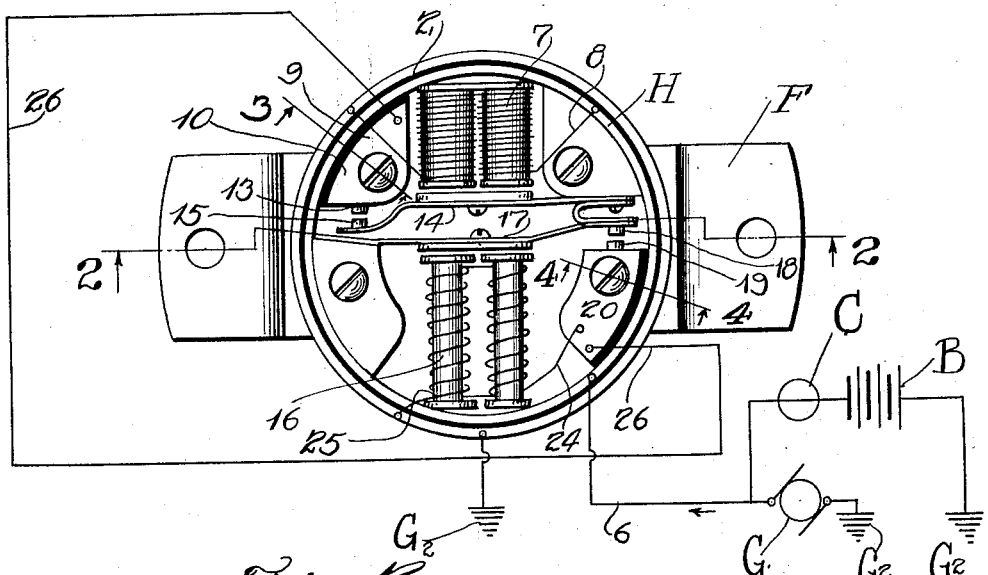
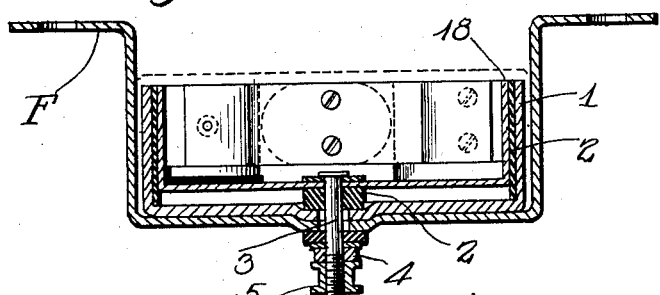
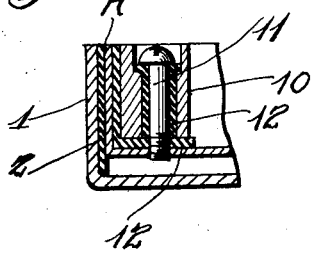
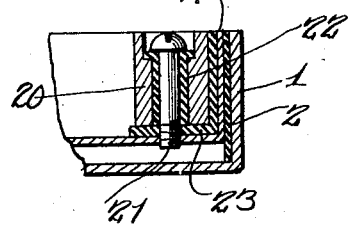
INVENTOR.
Everett R. Slagle
BY
ATTORNEY.

Patented May 6, 1930

1,757,486

UNITED STATES PATENT OFFICE

EVERETT R. SLAGLE, OF SAYRE, PENNSYLVANIA

GENERATOR AND BATTERY PROTECTIVE MEANS

Application filed June 27, 1925. Serial No. 40,088.

My invention relates to an improvement in generator and battery protective means.

One of the primary objects is to prevent the armature in the generator from burning out in the event of an open or high-resistance circuit (such as may result from battery corrosion).

Another object is to provide an automatic grounding device for generators when the current delivered by the generator is in excess of a predetermined voltage.

Another object is to protect the storage battery by grounding the generator when the voltage of the storage battery denotes a fully-charged battery.

With these objects in view, my present invention consists of a device for grounding the generator. It further consists in means for grounding the generator automatically in the event of a high-resistance connection. In the event of a high-resistance circuit, which might be caused by the battery terminal becoming corroded, the voltage of the generator would necessarily rise. When the generator reaches the predetermined voltage, even though the circuit is not open, this instrument automatically grounds the generator, thereby precluding any possible damage to the generator as a result of excess voltage.

In the accompanying drawings:

Fig. 1 is a view looking into the device;

Fig. 2 is a section on line 2—2 of Fig. 1, looking in the direction of the arrows;

Fig. 3 is a section, on line 3—3 of Fig. 1, looking in the direction of the arrows;

Fig. 4 is a section on the line 4—4 of Fig. 1 looking in the direction of the arrows.

A, represents a metallic container. This is shown in circular form, and includes a base and an annular flange. This container A is held in a case 1, from which it is separated by a layer of insulation 2. Both the container A and the outer case 1 are preferably made of brass. They are held together conveniently by a bolt 3 at the center, and a nut 4, and this forms a binding-post with a thumb-nut 5 on the outer end, between which end the nut 4 the wire 6 from the generator is held.

An electro-magnet 7 made of insulated copper wire of suitable resistance is located at a convenient point within the container A, one end 8 of the wire being connected with the container, and the other end 9 of the wire with the outer case 1, as shown in Fig. 1.

The insulated block 10 shown in detail in Fig. 3 is held by a screw 11 to the bottom of the container, the block and screw being surrounded by insulation 12, as viewed in Fig. 3. This block 10 has a contact 13, and the armature 14 of the electro-magnet 7 has a contact 15.

B, represents the battery; G, the generator; C is the usual cut-out in the circuit between the battery and generator.

The numeral 16 indicates an electro-magnet wound with insulated copper wire of a suitable resistance so that when the device functions at the necessary current required to operate, the voltage across this magnet shall be less than one-half of one volt. The wire wound on this magnet is of much larger diameter than that of the electro-magnet 7 previously described. This has an armature 17 which has a contact 18; and a contact 19 on the insulated block 20 is in position to be engaged by the contact 18. The block 20 is held in position by a screw 21 extending into the base of the container A, from which it is insulated by the insulation 22 and 23, as shown in Fig. 4. One terminal wire 24 of the electro-magnet 16 extends to this insulated block 20, and the other terminal wire 25 to the outer case 1, as shown in Fig. 1. Another wire 26 extends from the insulated block 20 to the insulated block 10.

$G^2$ represents groundings for the case 1, the generator and the battery. F, is a frame held by the bolt 3 to the case by which the device is fastened in place.

In operation, the automatic cut-out C operates in the the usual manner, and has nothing to do with the present invention. Its function is to permit the generator to charge the battery when the voltage of the generator is greater than the voltage of the battery, and when less, and the current furnished by the generator is insufficient to charge the battery, the cutout automatically disconnects the battery from the generator.

The wire 6 carries the current through the container A, and the wire 8 to the electro-magnet 7, which is preferably wound to carry in the neighborhood of two-tenth (2/10) of a volt, and three-tenths (3/10) of an ampere. Whenever the current from the generator reaches approximately eight and one-half (8½) volts, the armature 14 is attracted by the magnet 7 until the contacts 13 and 15 come together, and a circuit is closed therethrough, whereupon it is carried through the wire 26, which connects the insulated blocks 10 and 20, to the latter and through the wire 24. The magnet 16 becomes energized, attracting the armature 17, and bringing the contacts 18 and 19 together, thus grounding the generator, and the current flowing through the magnet 16 continues to hold down the armature 17 until such time as the generator has stopped turning. Thus it will be seen that when the generator has stopped turning, the armature 17 will be released by the magnet 16, permitting the current from the generator to pass through the cut-out C, into the storage battery B, if the trouble has been repaired, or the current in the battery reduced.

I claim:

1. A device of the character described including a casing, electro-magnets mounted therein, and wound for successive actuation, movable armatures for the electro-magnets, each of said armatures having one end fixed and the opposite end free and movable, resilient means connecting the fixed end of one of said armatures with the movable end of the other, and contact blocks fixed in the casing and insulated therefrom to be engaged by the movable ends of the armatures.

2. A device of the character described including a casing, electro-magnets mounted therein, and wound for successive actuation, movable armatures for the electro-magnets, each of said armatures having one end fixed and the opposite end free and movable, resilient means connecting the fixed end of one of said armatures with the movable end of the other, contact blocks fixed in the casing and insulated therefrom to be engaged by the movable ends of the armatures, a container for receiving the casing, insulating means interposed between the casing and container, and a bracket connected with and for supporting the container.

3. A device of the character described including electro-magnets, associated together for successive actuation, movable armatures for the electro-magnets, each of said armatures having a fixed and a free end, and means connecting the fixed end of one of said armatures with the free end of the other.

4. A device of the character described including a casing, electro-magnets mounted therein, associated together for successive actuation, movable armatures for the electro-magnets, each of said armatures having a fixed and a free end, means connecting the fixed end of one of the armatures with the free end of the other, and contacts in position to be engaged by the armatures.

5. A device of the character described including a casing, electro-magnets mounted in said casing in opposed relation, armatures for said electro-magnets and extending approximately parallel in said casing in opposed relation, each of said armatures having a fixed and a free end, the free end of one armature being opposite the fixed end of the other, and means connecting the fixed end of one of the armatures with the free end of the other.

6. A device of the character described including a casing, electro-magnets mounted in said casing in opposed relation, armatures mounted between the electro-magnets and extending approximately parallel in opposed relation, each of said armatures having a fixed and a free end, the free end of one armature being opposite the fixed end of the other, means connecting the fixed end of one of the armatures with the free end of the other and contact blocks arranged on opposite sides of the electro-magnets opposite the ends of the armature.

7. A device of the character described including a casing, electro-magnets mounted in said casing in opposed relation, armatures mounted between the electro-magnets and extending approximately parallel in opposed relation, each of said armatures having a fixed and a free end, the free end of one armature being opposite the fixed end of the other, contact blocks arranged on opposite sides of the electro-magnets opposite the ends of the armatures, certain of said contact blocks carrying the fixed ends of the armatures, and the other contact blocks having contacts in position to engage the free ends of the armatures, and resilient means connecting the free end of one of the armatures with the fixed end of the other.

In testimony whereof I affix my signature.

EVERETT R. SLAGLE.